United States Patent
Kuno

(10) Patent No.: US 10,178,249 B2
(45) Date of Patent: Jan. 8, 2019

(54) SYSTEM THAT SAVES DATA, SERVER, AND METHOD

(71) Applicant: CANON KABUSHIKI KAISHA, Tokyo (JP)

(72) Inventor: Koichi Kuno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/478,416

(22) Filed: Apr. 4, 2017

(65) Prior Publication Data

US 2017/0302807 A1    Oct. 19, 2017

(30) Foreign Application Priority Data

Apr. 15, 2016 (JP) ................ 2016-082228

(51) Int. Cl.
| | |
|---|---|
| *H04N 1/00* | (2006.01) |
| *G06F 3/12* | (2006.01) |
| *G06K 15/02* | (2006.01) |
| *G06F 11/34* | (2006.01) |

(Continued)

(52) U.S. Cl.
CPC ....... *H04N 1/00244* (2013.01); *G06F 3/1203* (2013.01); *G06F 3/1236* (2013.01); *G06F 3/1288* (2013.01); *G06F 11/34* (2013.01); *H04L 29/08* (2013.01); *H04L 67/06* (2013.01); *H04L 67/1097* (2013.01); *H04L 67/2842* (2013.01);

(Continued)

(58) Field of Classification Search
None
See application file for complete search history.

(56) References Cited

U.S. PATENT DOCUMENTS 5,379,292 A * 1/1995 Kurata ............... H04L 12/4625 370/216
7,568,031 B2 * 7/2009 Tanimoto ............. G06F 3/1209 358/1.15

(Continued)

FOREIGN PATENT DOCUMENTS

| EP | 2211274 A2 | 7/2010 |
| JP | 2010044468 A | 2/2010 |
| JP | 2016054442 A | 4/2016 |

OTHER PUBLICATIONS

European Search Report issued in corresponding European Patent No. 17000483.2 dated May 31, 2017.

*Primary Examiner* — Beniyam Menberu
(74) *Attorney, Agent, or Firm* — Venable LLP

(57) ABSTRACT

An object of the present invention is to provide a system capable of preventing data from being lost even in the case where upload of the data has failed and of preventing saved data from being deleted without a user knowing it. The present invention is a system that saves data in a storage server and the system includes: a determination unit configured to determine whether or not upload of the data to the storage server has succeeded; a saving unit configured to temporarily save the data in the case where the upload has failed; a notification unit configured to notify a user of that the temporarily saved data exists in the case where the saving unit temporarily saves the data; a retry unit configured to try reupload of the temporarily saved data to the storage server; and a deletion unit configured to delete the temporarily saved data in the case where the reupload has succeeded.

17 Claims, 16 Drawing Sheets

(51) Int. Cl.
*H04L 29/08* (2006.01)
*H04L 29/14* (2006.01)

(52) U.S. Cl.
CPC .......... *H04L 67/2861* (2013.01); *H04L 69/40* (2013.01); *H04N 1/00411* (2013.01)

(56) References Cited

U.S. PATENT DOCUMENTS

| | | | | |
|---|---|---|---|---|
| 8,291,170 B1* | 10/2012 | Zhang | ................ | G06F 11/1466 711/135 |
| 8,656,057 B1* | 2/2014 | Dutch | ................ | G06F 11/1453 709/246 |
| 2004/0109063 A1* | 6/2004 | Kusaka | ............. | H04N 1/00477 348/207.1 |
| 2004/0249956 A1* | 12/2004 | Tanimoto | ............. | G06F 3/1209 709/227 |
| 2005/0203682 A1* | 9/2005 | Omino | ................ | H04L 12/2856 701/24 |
| 2006/0168310 A1* | 7/2006 | Koyanagi | ............... | H04L 47/14 709/233 |
| 2006/0215641 A1* | 9/2006 | Kitagawa | ................ | H04L 43/10 370/352 |
| 2006/0218210 A1* | 9/2006 | Sarma | ............... | G06F 17/30578 |
| 2012/0194837 A1* | 8/2012 | Kamata | .............. | H04N 1/00244 358/1.13 |
| 2013/0080488 A1* | 3/2013 | Li | ........................ | G06F 11/0709 707/831 |
| 2013/0080905 A1* | 3/2013 | Park | ................... | H04N 1/00244 715/738 |
| 2015/0095411 A1 | 4/2015 | Okumura | | |
| 2015/0264057 A1* | 9/2015 | Mevec | ................ | G06F 11/1448 726/22 |
| 2016/0094753 A1* | 3/2016 | Miyazawa | ......... | H04N 1/32101 358/1.18 |
| 2016/0224279 A1* | 8/2016 | Kim | ........................ | H04L 67/10 |
| 2017/0063607 A1* | 3/2017 | Maruyama | ......... | H04L 41/0686 |

* cited by examiner

| SCAN PARAMETER | |
|---|---|
| DOCUMENT TYPE | PHOTO |
| SIZE | A4 |
| RESOLUTION | 300 |
| MODEL INFORMATION | |
| MODEL NAME | AAAA |
| SENSOR TYPE | CIS |
| IMAGE PROCESS | |
| FORMAT | PDF |
| ROTATION | 90 |
| UNSHARP MASK | ON |
| REMOVE BASE COLOR | ON |
| UPLOAD INFORMATION | |
| STORAGE SERVER NAME | A |
| USER NAME | GUEST |
| USER PASSWORD (OPTION) | XXXXXXX |
| REMAIN RETRY COUNTER | 10 |
| RETRY NEXT TIME | 2014/11/11 11:11:10 |

FIG.8

SYSTEM THAT SAVES DATA, SERVER, AND METHOD

BACKGROUND OF THE INVENTION

Field of the Invention

The present invention relates to a technique to save image data by making use of a storage service.

Description of the Related Art

The storage service is one of the services making use of the Internet and is the service that saves a file in a virtual storage on the Internet and enables a variety of terminals, such as a PC, a smartphone, and a tablet, to access the saved file in a sharing manner. In the storage service, the data capacity within which a file can be uploaded is specified. In the common storage service, in the case where data cannot be saved because of a shortage of the empty capacity, a user is notified of an error indicating that the data cannot be saved. It is necessary for the user notified of the error to secure an empty capacity that is necessary by, for example, deleting an unnecessary file and to save the data again.

As a method of addressing the above-described problem, Japanese Patent Laid-Open No. 2010-044468 has disclosed the technique to keep, in the case where a user uploads an image exceeding a capacity limit, data of the image on the server for a predetermined period of time to postpone the deletion of the image data.

SUMMARY OF THE INVENTION

However, with the method described in Japanese Patent Laid-Open No. 2010-044468, there is a possibility that data saved on the server is deleted without a user knowing it.

Consequently, an object of the present invention is to provide a system capable of preventing data from being lost even in the case where upload of the data has failed and of preventing saved data from being deleted without a user knowing it.

The present invention is a system that saves data in a storage server and the system includes: a determination unit configured to determine whether or not upload of the data to the storage server has succeeded; a saving unit configured to temporarily save the data in a case where the upload has failed; a notification unit configured to notify a user of that the temporarily saved data exists in a case where the saving unit temporarily saves the data; a retry unit configured to try reupload of the temporarily saved data to the storage server; and a deletion unit configured to delete the temporarily saved data in a case where the reupload has succeeded.

Further features of the present invention will become apparent from the following description of exemplary embodiments (with reference to the attached drawings).

BRIEF DESCRIPTION OF THE DRAWINGS

FIG. 8 is a scan ticket according to the first embodiment;

FIG.15 is a diagram showing the relationship of FIGS. 15A and 15B;

DESCRIPTION OF THE EMBODIMENTS

In the following, with reference to the attached drawings, embodiments of the present invention are explained in detail. However, the following embodiments are merely exemplary and are not intended to limit the present invention according to the scope of the claims. Further, all combinations of features explained below are not necessarily indispensable as a solution of the present invention. In each drawing, the same symbol is attached to the same element.

<First Embodiment>

To begin with, by using FIG. 1 to FIG. 3, a multi function image forming apparatus (hereinafter, MFP), a PC that is used as a client and a server, and a system made up by connecting these units, which are used in the present embodiment are explained.

(About Configuration of MFP)

Figure 1:
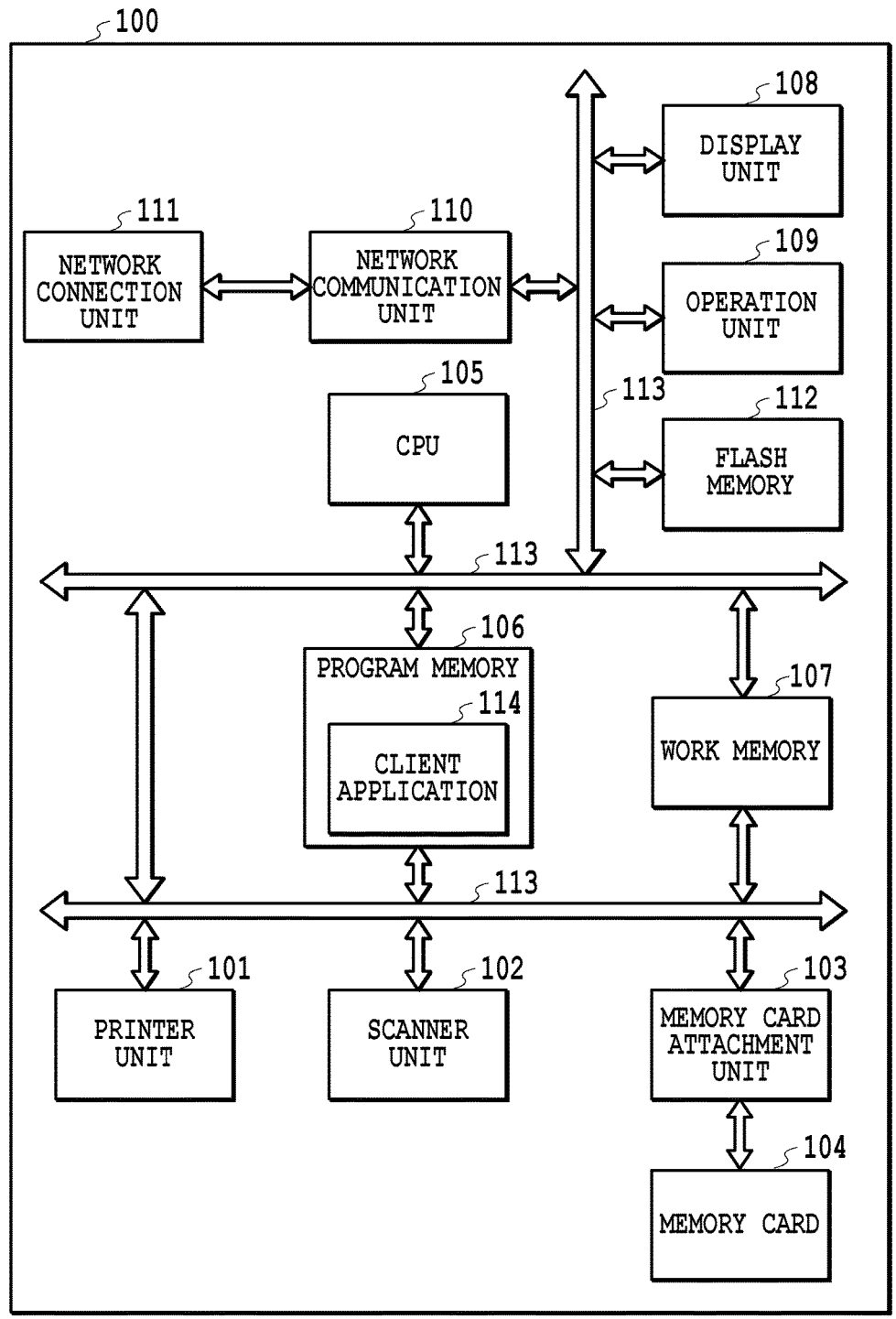
FIG. 1 is a block diagram showing an outline configuration of an MFP according to a first embodiment.

FIG. 1 is a block diagram showing an outline configuration of an MFP that is an example of an image forming apparatus according to the present embodiment. An MFP 100 includes a printer unit 101, a scanner unit 102, and a memory card attachment unit 103. The MFP 100 has a printer function implemented by the printer unit 101, a scan function implemented by the scanner unit 102, and a storage function implemented by a memory card 104 attached to the memory card attachment unit 103. These functions are provided to a user who actually touches and operates the MFP 100, but it is also possible to provide these functions to a user via a network through a network connection unit 111.

The printer unit 101 forms an image on a printing medium based on print data included in a print job received from an external device connected to the MFP 100, image data stored in the memory card 104, etc. As a method of forming an image, it may be possible to use an arbitrary method in accordance with the MFP 100, such as an ink jet method and an electrophotographic method. The scanner unit 102 acquires electronic data by optically reading a document set on a document table and converts the acquired electronic data into a specified file format. The MFP 100 transmits electronic data converted into a specified file format to an external device via a network. Alternatively, it may also be possible for the MFP 100 to save the electronic data in a storage medium, such as a flash memory 112 within the MFP 100 and the memory card 104 attached to the MFP 100. In a copy service that uses the MFP 100, image data generated by the scanner unit 102 reading a document placed on a document table is transmitted to the printer unit 101 and the printer unit 101 forms an image on a printing medium based on the transmitted image data. In the present embodiment, it is possible for an external device connected with the MFP 100 to read a file stored in the memory card 104 via a network, to edit the read file, to save the edited file in the memory card 104, and so on.

Further, the MFP 100 includes a central processing unit (hereinafter, CPU) 105, a program memory 106, a work memory 107, a display unit 108, and an operation unit 109. The CPU 105 centrally controls each component of the MFP 100, which is connected via a signal line 113. The program memory 106 is a nonvolatile memory (e.g., ROM) to store programs executed by the CPU 105, such as a client application 114 to communicate with an information processing server, to be described later. The programs executed by the CPU 105 also include programs to perform processing, to be described later, according to the present embodiment. The work memory 107 is a volatile memory (e.g., RAM) to temporarily store image data and the like that is generated at the time of the execution of each piece of processing and is used for buffering and the like. The display unit 108 is a unit (e.g., LCD) configured to present information to a user in such a manner that the user can recognize the information visually. The operation unit 109 is a unit configured to receive an input by a user and includes a button, a touch panel, a switch, etc.

Further, the MFP 100 includes a network communication unit 110, the network connection unit 111, and the flash memory 112. The network communication unit 110 is a unit configured to perform various kinds of communication by connecting the MFP 100 to a network and compatible with at least one of a wired LAN and a wireless LAN. The network connection unit 111 is a unit configured to connect the network communication unit 110 to a network medium. In the case where the network communication unit 110 is compatible with a wired LAN, the network connection unit 111 is a connector to connect a LAN cable of a wired LAN to the MFP 100. On the other hand, in the case where the network communication unit 110 is compatible with a wireless LAN, the network connection unit 111 is an antenna. The flash memory 112 is a nonvolatile memory to store data received by the network communication unit 110.

(About configuration of PC used as client and server)

Figure 2:
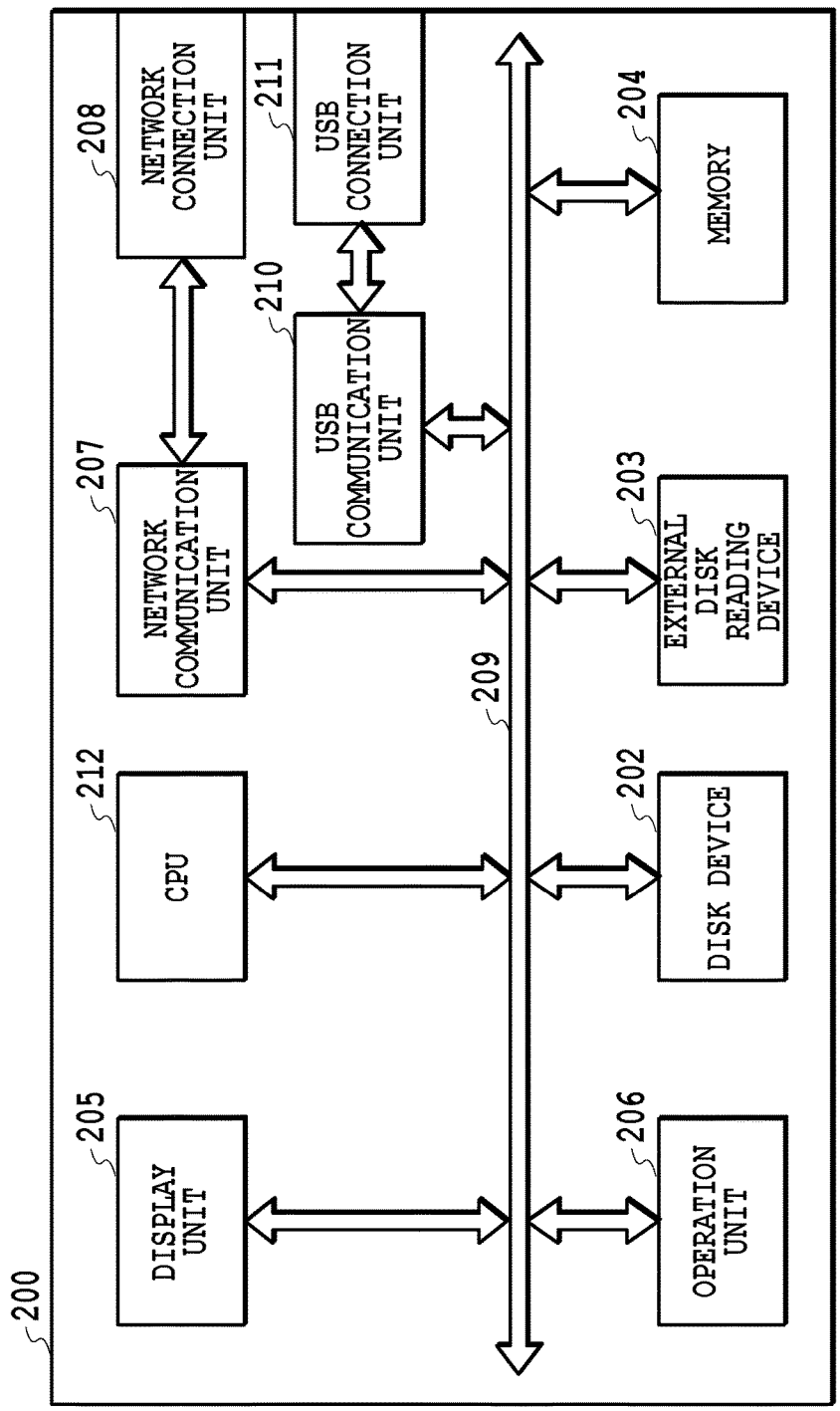
FIG. 2 is a block diagram showing an outline configuration of a PC that is used as a client and a server according to the first embodiment.

FIG. 2 is a block diagram showing an outline configuration of a PC used as a client and a server according to the present embodiment. A PC 200 includes a CPU 212, a disk device 202, an external disk reading device 203, a memory 204, a display unit 205, an operation unit 206, a network communication unit 207, a network connection unit 208, a USB communication unit 210, and a USB connection unit 211.

The CPU 212 centrally controls each component of the PC 200, which is connected with one another via a signal line 209. The disk device 202 is a device (e.g., HDD) to store various files and in the disk device 202, application programs, an operating system (hereinafter, OS), etc., executed by the CPU 212 are installed. The external disk reading device 203 is a device to read contents of a mounted storage medium (CD-ROM and the like). The memory 204 is a volatile memory (e.g., RAM) to temporarily store data generated by the CPU 212 in accordance with the necessity and used for buffering and the like. The display unit 205 is a unit (e.g., CRT, LCD, etc.) to present information to a user in such a manner that the user can recognize the information visually. The operation unit 206 is a unit configured to receive an input by a user and includes a keyboard, a mouse, etc. The network communication unit 207 is a unit configured to perform various kinds of communication by connecting the PC 200 to a network. The network connection unit 208 is a unit configured to connect the network communication unit 207 to a network medium. Like the MFP 100, the network communication unit 207 and the network connection unit 208 of the PC 200 are compatible with at least one of a wired LAN and a wireless LAN. The USB communication unit 210 is a unit configured to perform communication with various external devices, such as an image forming apparatus, via a USB interface. The USB connection unit 211 is a unit (e.g., USB connector) configured to connect a USB to the PC 200.

(About Configuration of Network)

Figure 3:
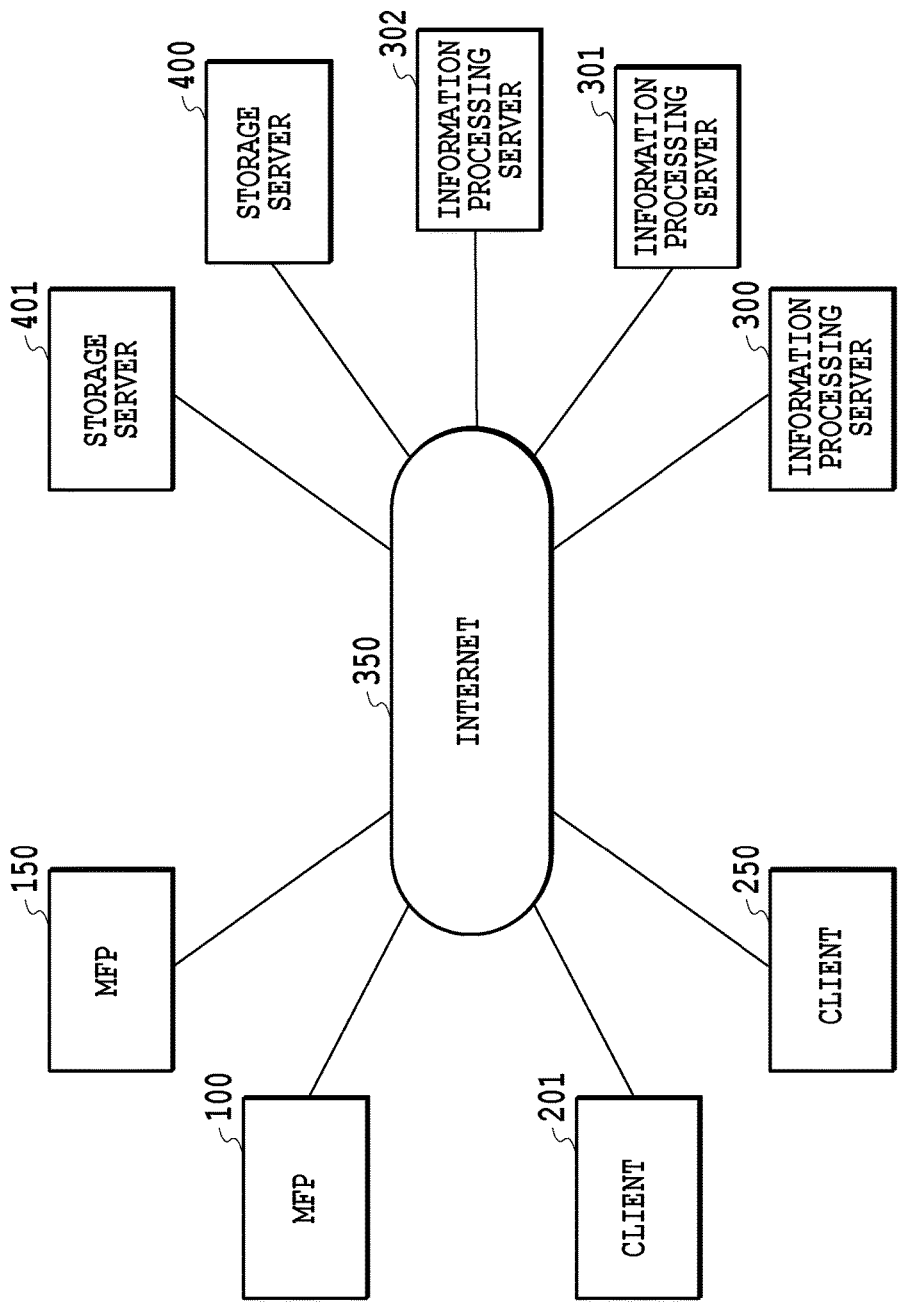
FIG. 3 is a diagram showing a configuration of a system according to the first embodiment.

FIG. 3 is a diagram showing a network configuration of a system capable of implementing a client-server type storage service according to the present embodiment. As shown in FIG. 3, the system includes MFPs, clients, information processing servers, and storage servers. These devices making up the system are connected with one another via Internet 350 and capable of transmission and reception of data with one another via the Internet 350.

In FIG. 3, an MFP 150 is an MFP having the same functionality as that of the MFP 100. A client 201 and a client 250 are PCs in which a client OS is installed. An information processing server 300, an information processing server 301, and an information processing server 302 are PCs in which an information processing server OS is installed. A storage server 400 and a storage server 401 are PCs used to upload a file in a storage service. As the client, the information processing server, and the storage server shown in FIG. 3, it is possible to use the PC 200 explained by using FIG. 2. Here, as shown in FIG. 3, the system is explained, which includes two MFPs, two clients, three information processing servers, and two storage servers, but the numbers of devices are not limited to this example and may be changed arbitrarily.

In the following, processing in the storage service according to the present embodiment, which is implemented by the system shown in FIG. 3, is explained. Specifically, the processing is processing for the information processing server 300 to cause the MFP 100 to perform document reading triggered by an input of a user in the client 201 and for the information processing server 301 to upload image data obtained by the reading to the storage server 400. In the following, the case is explained where the information processing server 300 and the information processing server 301 perform different pieces of processing, respectively, but it may also be possible for one server to perform together the processing performed by the information processing server 300 and the processing performed by the information processing server 301.

(About Processing Performed by Client)

Figure 4:
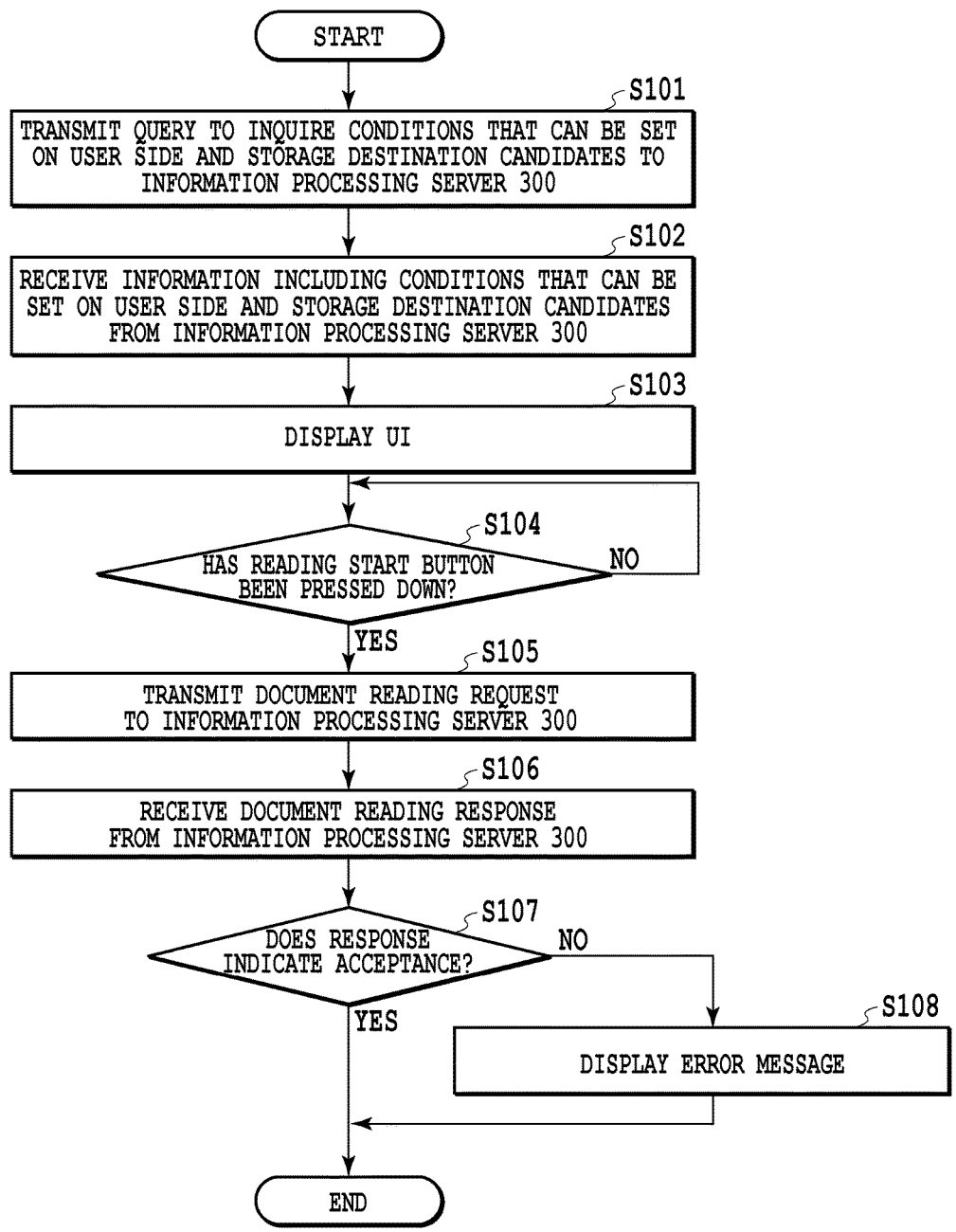
FIG. 4 is a flowchart of processing that is performed by the client according to the first embodiment.

FIG. 4 is a flowchart of processing performed by the client 201 according to the present embodiment. This processing is started by a user giving instructions to perform document reading by making use of a storage service on an application launched in the client 201.

Figure 5:
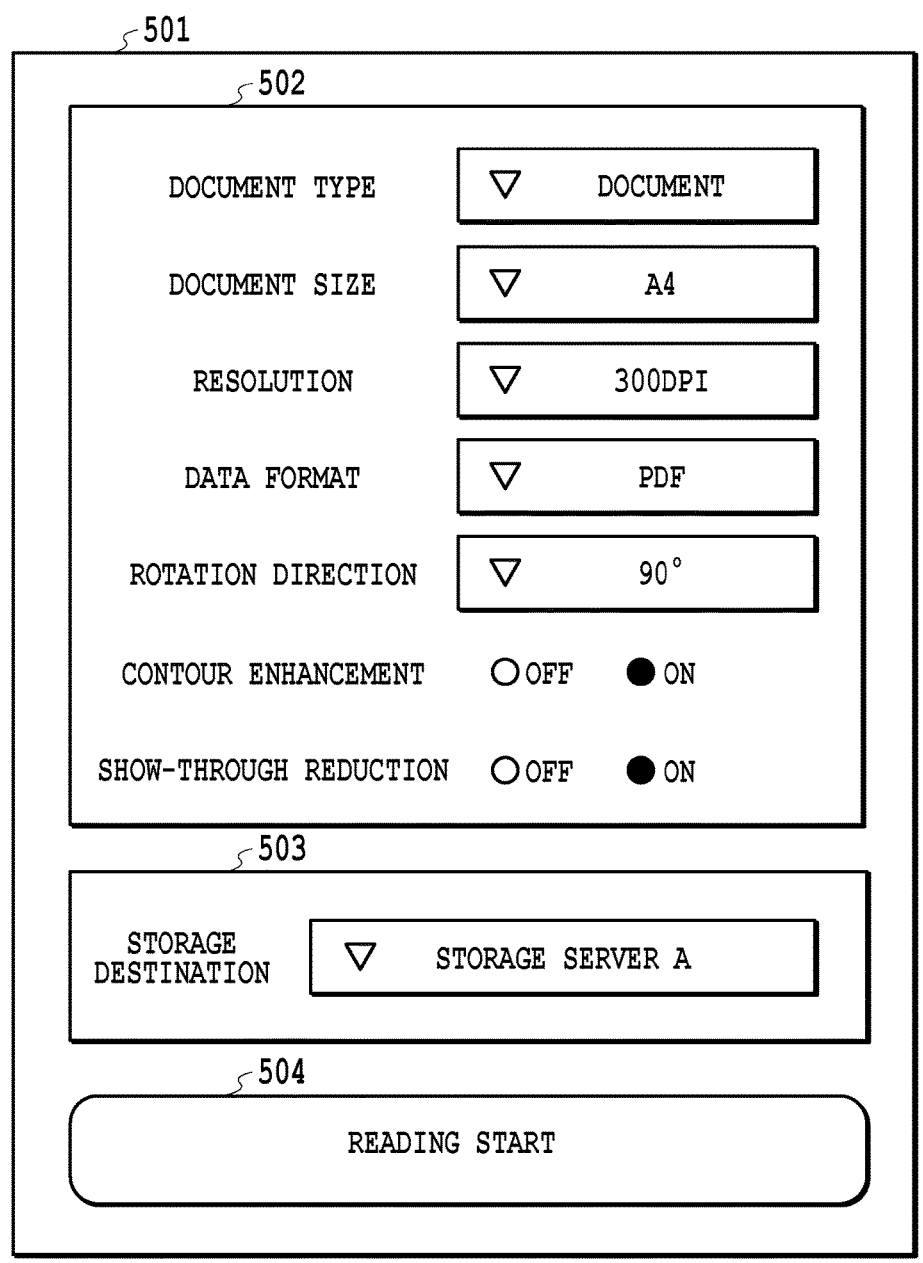
FIG. 5 is a UI that is displayed by the client according to the first embodiment.

At step S101 (hereinafter, abbreviated to S101 and the other steps are also abbreviated similarly), the client 201 transmits a query to inquire conditions relating to document reading that can be set on a user side and save destination candidates to the information processing server 300. At S102, the client 201 receives information including conditions relating to document reading that can be set on the user side and save destination candidates as a response to the query transmitted at S101 from the information processing server 300. At S103, the client 201 creates a UI (User Interface) based on the information received from the information processing server 300 at S102 and displays the UI on the display unit 205. FIG. 5 shows an example of a UI displayed by the client 201 at S103. As shown in FIG. 5, a UI 501 has a reading detail setting unit 502, a save destination specifying unit 503, and a Reading start button 504. A user sets detailed conditions relating to reading via the reading detail setting unit 502, specifies a save destination of image data via the save destination specifying unit 503, and presses down the Reading start button 504.

At S104, the client 201 determines whether or not the Reading start button 504 has been pressed down. In the case where the results of the determination at S104 indicate that the Reading start button 504 has been pressed down, the processing advances to S105 and on the other hand, in the case where the results of the determination at S104 indicate that the Reading start button 504 has not been pressed down, the client 201 waits until the user presses down the Reading start button 504. At S105, the client 201 transmits a document reading request based on the contents set by the user via the UI 501 to the information processing server 300. At S106, the client 201 receives a document reading response corresponding to the document reading request transmitted at S105 from the information processing server 300.

At S107, the client 201 determines whether or not the document reading response received at S106 indicates acceptance of document reading. In the case where the results of the determination at S107 indicate that the document reading response indicates acceptance of document reading, the series of processing ends and on the other hand, in the case where the results of the determination at S107 indicate that the document reading response indicates an error, the processing advances to S108. At S108, the client 201 displays an error message on the display unit 205 and the series of processing ends. The error message that is displayed at S108 may always be the same or it may also be possible to display a different error message in accordance with the contents of an error. For example, it is assumed that the document reading response indicates that a scan cannot be performed because the image data whose upload failed at the time of the previous reading is left. In this case, it may also be possible for the client 201 to display a message to the effect that "Upload of image data failed at the time of the previous reading. A scan cannot be performed until the image data is uploaded. Secure an empty area and retry". At the point in time of the completion of the series of processing shown in FIG. 4, the job relating to reading in the client 201 is completed. Due to this, it is made possible for the user to perform another operation on the client 201 in the case where a PC that is not capable of multitasking is used as the client 201. The above is the contents of the processing performed by the client 201 according to the present embodiment.

(About Processing Performed by Information Processing Server 300)

Figure 6:
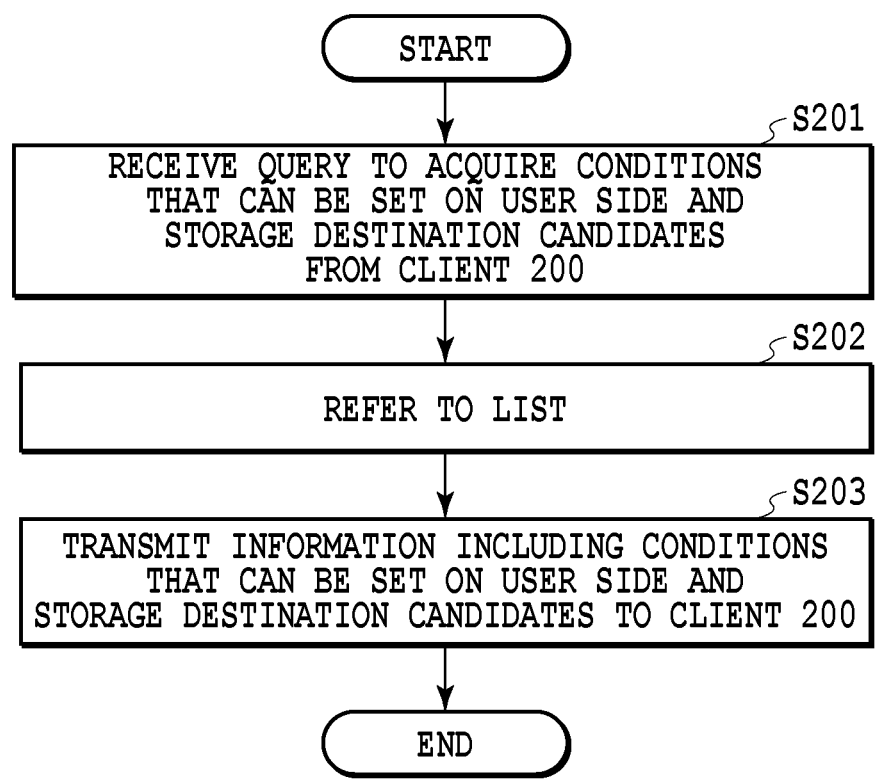
FIG. 6 is a flowchart of processing that is performed by an information processing server according to the first embodiment.

FIG. 6 is a flowchart of processing that is performed at the time at which the information processing server 300 that receives the query transmitted by the client 201 at S101 transmits information corresponding to the query to the client 201. At S201, the information processing server 300 receives the query to inquire conditions relating to document reading that can be set on the user side and save destination candidates, which the client 201 has transmitted at S101. At S202, the information processing server 300 refers to a list stored in a database and acquires information including conditions relating to document reading that can be set on the user side and save destination candidates, which corresponds to a storage service that a user makes use of. Here, the list that the information processing server 300 refers to is held by the information processing server 300 itself. Further, in the list, conditions relating to document reading that can be set and save destination candidates for each storage service are held, and therefore, it is not necessary for the information processing server 300 to manage the information relating to the setting of document reading for each model of the MFP. At S203, the information processing server 300 transmits the information including conditions relating to document reading that can be set on the user side and save destination candidates acquired at S202 to the client 201.

Figure 7:
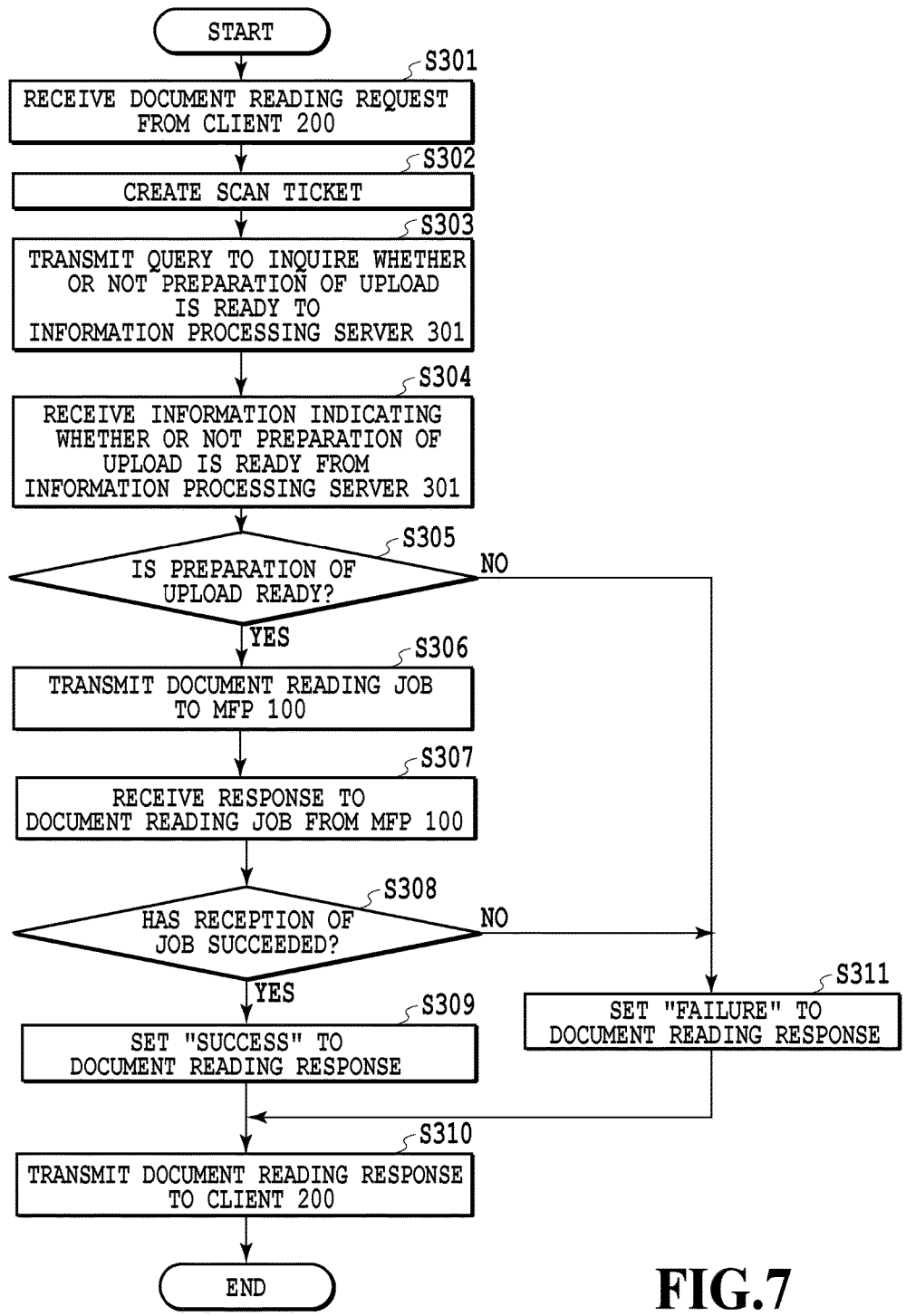
FIG. 7 is a flowchart of processing that is performed by the information processing server according to the first embodiment.

FIG. 7 is a flowchart of processing that is performed at the time at which the information processing server 300 that receives the document reading request transmitted by the client 201 at S105 transmits the document reading response corresponding to the document reading request. At S301, the information processing server 300 receives the document reading request transmitted by the client 201 at S105. At S302, the information processing server 300 creates a scan ticket in accordance with the document reading request received at S301. Details of the scan ticket will be described later.

At S303, the information processing server 300 transmits a query to inquire whether or not preparation of upload is ready to the information processing server 301. The query that is transmitted at this step may include the scan ticket created at S302 and the information processing server 301 has a function to temporarily store the image data obtained by the reading in the MFP 100 (details will be described later). At S304, the information processing server 300 receives information indicating whether or not preparation of upload is ready from the information processing server 301 as a response to the query transmitted at S303. At S305, the information processing server 300 determines whether or not preparation of upload is ready based on the information received at S304. In the case where the results of the determination at S305 indicate that preparation of upload is ready, the processing advances to S306 and on the other hand, in the case where the results of the determination at S305 indicate that preparation of upload is not ready, the processing advances to S311.

At S306, the information processing server 300 transmits a document reading job including the scan ticket created at S302 to the MFP 100. At S307, the information processing server 300 receives a response to the document reading job transmitted at S306 from the MFP 100. At S308, the information processing server 300 determines whether or not reception of the document reading job has succeeded based on the response received at S307. In the case where the results of the determination at S308 indicate that reception of the document reading job has succeeded, the processing advances to S309 and on the other hand, in the case where the results of the determination at S308 indicate that reception of the document reading job has failed, the processing advances to S311.

At S309, the information processing server 300 sets information (value indicating "success") indicating that the document reading job has been registered in the MFP 100 to the document reading response that is transmitted to the client 201. At S310, the information processing server 300 transmits the document reading response to the client 201.

On the other hand, in the case where the document reading job has not been received (NO at S305 or S308), at S311, the information processing server 300 sets information (value indicating "failure") indicating that the document reading job has not been registered in the MFP 100 to the document reading response. After this, the processing advances to S310 and the information processing server 300 transmits the document reading response to the client 201.

After the document reading response is transmitted to the client 201 at S310, the series of processing ends and the role of the information processing server 300 in the storage service ends. The above is the contents of the processing performed by the information processing server 300 according to the present embodiment.

(About Scan Ticket)

FIG. 8 shows an example of the scan ticket created at S302. As shown in FIG. 8, a scan ticket 701 includes a reading setting holding unit 702, a model information holding unit 703, an image processing setting holding unit 704, and an upload information holding unit 705. In the reading setting holding unit 702, detailed conditions (type, size, etc., of document) relating to the reading set by a user via the UI 501 are held. In the model information holding unit 703, information (model name, system of reading mechanism, etc.) relating to the MFP 100, which can be acquired by referring to the database of the information processing server 300, is held. In the image processing setting holding unit 704, detailed conditions (format of image data to be acquired and the like) relating to the image processing set by a user via the UI 501 are held. In the upload information holding unit 705, information relating to upload to the storage server 400 and information to control the retry that is performed in the case where upload has failed are held. In the present embodiment, access to the storage server 400 is supported by the information processing server 301. Consequently, information (specifically, user name, password, etc., to log in to the storage service) necessary to access the storage server 400 is held in the upload information holding unit 705, and thereby, it is made possible for the information processing server 301 to make use of the information in the subsequent processing.

An item "Remain Retry Counter" of the upload information holding unit 705 indicates the number of times of the retry of upload. The value of "Remain Retry Counter" decreases by 1 each time the retry of upload is performed and at the time at which the value of "Remain Retry Counter" reaches 0, the retry of upload is no longer performed. An item "Retry Next Time" of the upload information holding unit 705 indicates timing at which the retry is started. That is, the retry of upload is performed at arbitrary timing after the time of "Retry Next Time". Due to this, it is made possible to install a program in the system so as to perform the retry of upload after the elapse of a fixed time or the elapse of a time that can be changed, and therefore, it is made possible to prevent the network traffic from worsening, which is caused by the retry performed frequently. In the case where the value of "Remain Retry Counter" reaches 0, the image data temporarily saved for upload in the information processing server 301 and the scan ticket accompanying the image data are normally deleted in order to release the storage capacity. In this case, it may also be possible to install a program in the system so that the information processing server 301 deletes the image data after notifying a user of that the image data temporarily saved is deleted by a mail or a real-time communication tool and receiving user's approval. In the case where it is possible for the information processing server 301 to permit the storage of the image data temporarily stored in the information processing server 301 and the scan ticket accompanying this, it may also be possible to maintain the storage as it is. Due to this, it is made possible to perform reupload of image data as a background job at the idle time or to try reupload of image data in the case where the next scan instructions are given by a user.

(About Processing Performed by MFP)

Figure 9:
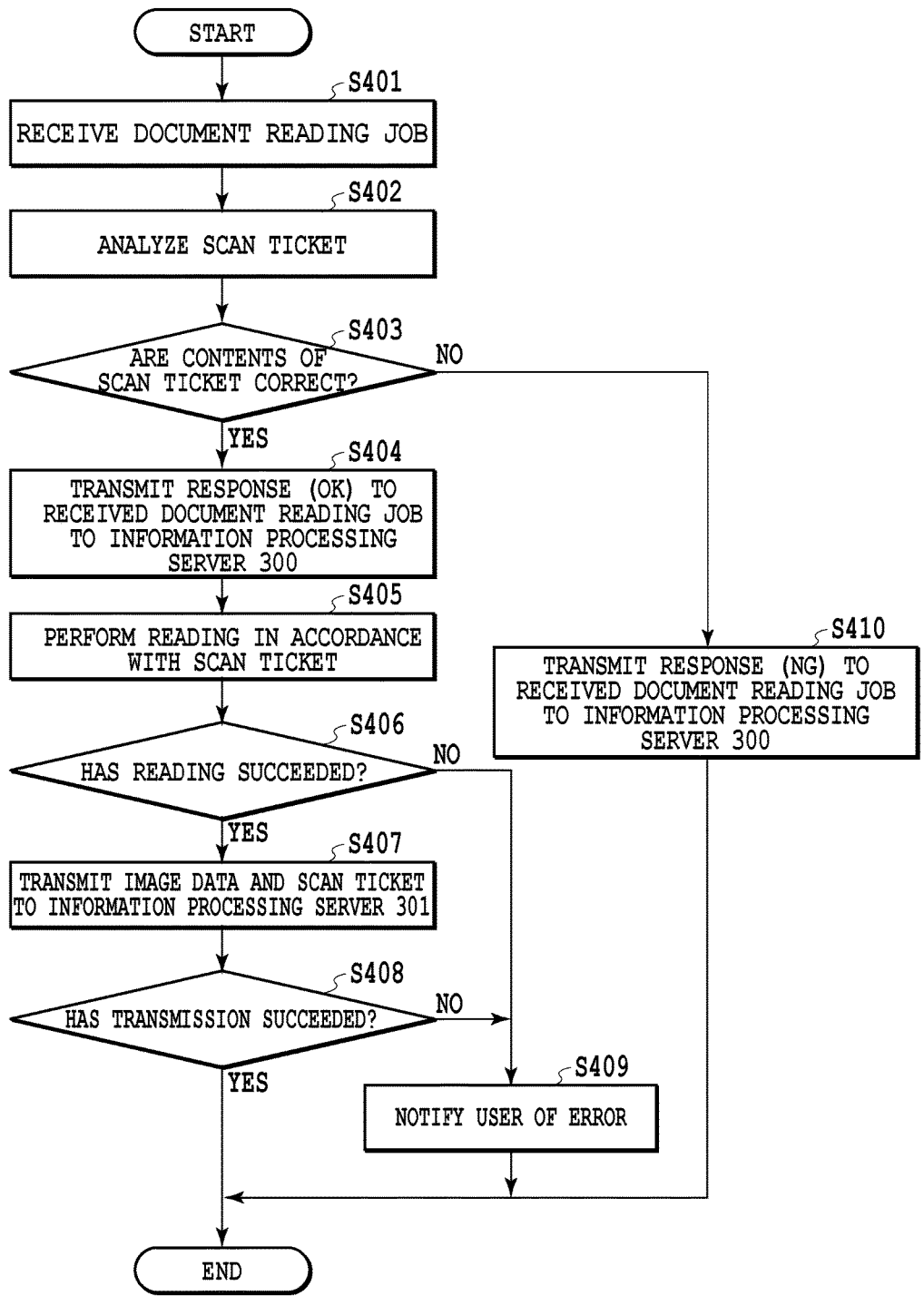
FIG. 9 is a flowchart of processing that is performed by the MFP according to the first embodiment.

FIG. 9 is a flowchart of processing performed by the MFP 100 that receives the document reading job transmitted by the information processing server 300 at S306.

At S401, the MFP 100 receives the document reading job transmitted by the information processing server 300 at S306. As described above, the document reading job that is received at this step includes the scan ticket. At S402, the MFP 100 analyzes the scan ticket obtained at S401. At S403, the MFP 100 determines whether or not the contents of the scan ticket are correct. In the case where the results of the determination at S403 indicate that the contents of the scan ticket are correct, the processing advances to S404 and on the other hand, in the case where the results of the determination at S403 indicate that the contents of the scan ticket are not correct, the processing advances to S410.

At S404, the MFP 100 transmits a response to the document reading job received at S401 to the information processing server 300. The response that is transmitted at this step includes information indicating that reception of the document reading job has succeeded. At S405, the MFP 100 performs document reading in accordance with the contents of the reading setting holding unit 702 of the scan ticket 701 and generates image data. At S406, the MFP 100 determines whether or not the document reading has succeeded. In the case where the results of the determination at S406 indicate that the reading has succeeded, the processing advances to S407 and on the other hand, in the case where the results of the determination at S406 indicate that the reading has failed, the processing advances to S409.

At S407, the MFP 100 transmits image data obtained by the reading at S405 and the scan ticket associated with the image data to the information processing server 301. At the time of transmitting the image data at this step, it may also be possible to transmit the image data at any time by dividing the image data for each band. At S408, the MFP 100 determines whether or not the data transmission at S407 has succeeded. In the case where the results of the determination at S408 indicate that the data transmission has succeeded, the series of processing ends and on the other hand, in the case where the results of the determination at S408 indicate that the data transmission has failed, the processing advances to S409.

In the case where reception of the document reading job has succeeded, but acquisition or transmission of the image data has failed (NO at S406 or S408), at S409, the MFP 100 notifies a user of that an error has occurred by displaying an error screen or by blinking a lamp. It is necessary for a user having learned the occurrence of an error by this step to cancel the error by operating the MFP 100.

In the case where reception of the document reading job has failed (NO at S403), at S410, the MFP 100 transmits a response to the document reading job received at S401 to the information processing server 300. The response that is transmitted at this step includes information indicating that reception of the document reading job has failed.

On the completion of the series of processing shown in FIG. 9, the role of the MFP 100 in the storage service ends and it is made possible for the MFP 100 to perform another job. The above is the contents of the processing performed by the MFP 100 according to the present embodiment.

(About Data Saved in Information Processing Server 301)

Figure 10:
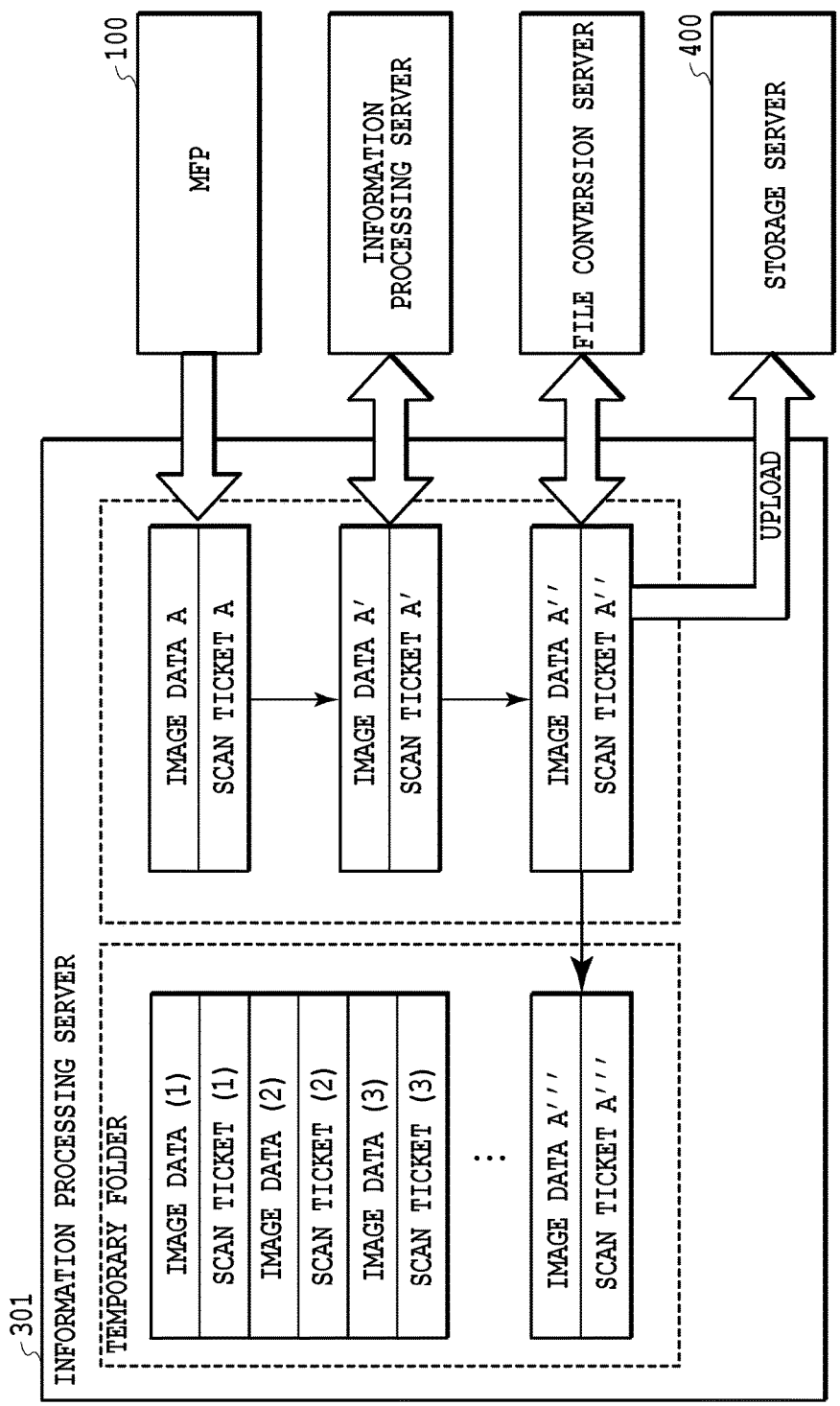
FIG. 10 is a diagram for explaining data that is saved temporarily by the information processing server according to the first embodiment.

FIG. 10 is a diagram for explaining data that is saved in a disk device of the information processing server 301. The information processing server 301 has a function to temporarily save image data and data, such as a scan ticket accompanying the image data, transmitted from the MFP 100. The wording "temporarily" means that it is not supposed to permanently save a file in the information processing server 301 and in the case a predetermined condition is satisfied, such as completion of upload of image data to the storage server 400, the data is deleted from the information processing server 301.

As shown in FIG. 10, the information processing server 301 performs transmission and reception of image data and a scan ticket with an external image processing server. The image processing server having received image data and a scan ticket from the information processing server 301 performs image processing based on the contents of the received scan ticket for the received image data. Then, the image processing server transmits the image data after the image processing and the scan ticket to the information processing server 301.

Further, the information processing server 301 performs transmission and reception of image data and a scan ticket with an external file conversion server. The file conversion server having received image data and a scan ticket from the information processing server 301 converts the file format of the image data in accordance with the contents of the received scan ticket. Then, the file conversion server transmits the image data after the conversion and the scan ticket to the information processing server 301.

The image processing and the file conversion by the above-described external servers are performed continuously in a situation in which no error occurs. In the case where the processing in accordance with the contents of the scan ticket cannot be performed any longer for some reason (in the case where an error has occurred), basically, in order to prevent jobs from being piled up, the related image data and scan ticket are deleted. In the normal image processing or the like, the case where processing is no longer performed due to the occurrence of an error is rarely supposed, but it is also possible to design processing so that the information processing server 301 skips only the image processing that is no longer performed due to an error and continuously performs the remaining processing in the case such as this.

On the other hand, in uploading image data to the storage server 400, a case is supposed where an error occurs in which it is not possible to upload the image data because the empty capacity for a user is short or the like even though the scan itself has succeeded. In the case such as this, a user desires that the image data be uploaded to the storage server in the end, and therefore, the information processing server 301 does not skip the upload processing and performs retry processing of upload later. Further, in the present embodiment, in order to prevent data from being lost at the time of the failure of upload, the information processing server 301 temporarily saves the image data and scan ticket for retry. In the present embodiment, the state of data, such as image data and a scan ticket, which is temporarily saved for retry by the information processing server 301 is called "temporary (a temporary state)" and the data is called a "temporary file". Further, a folder in which a temporary file is saved is called a "temporary folder".

(About Preprocessing Performed by Information Processing Server 301)

Figure 11:
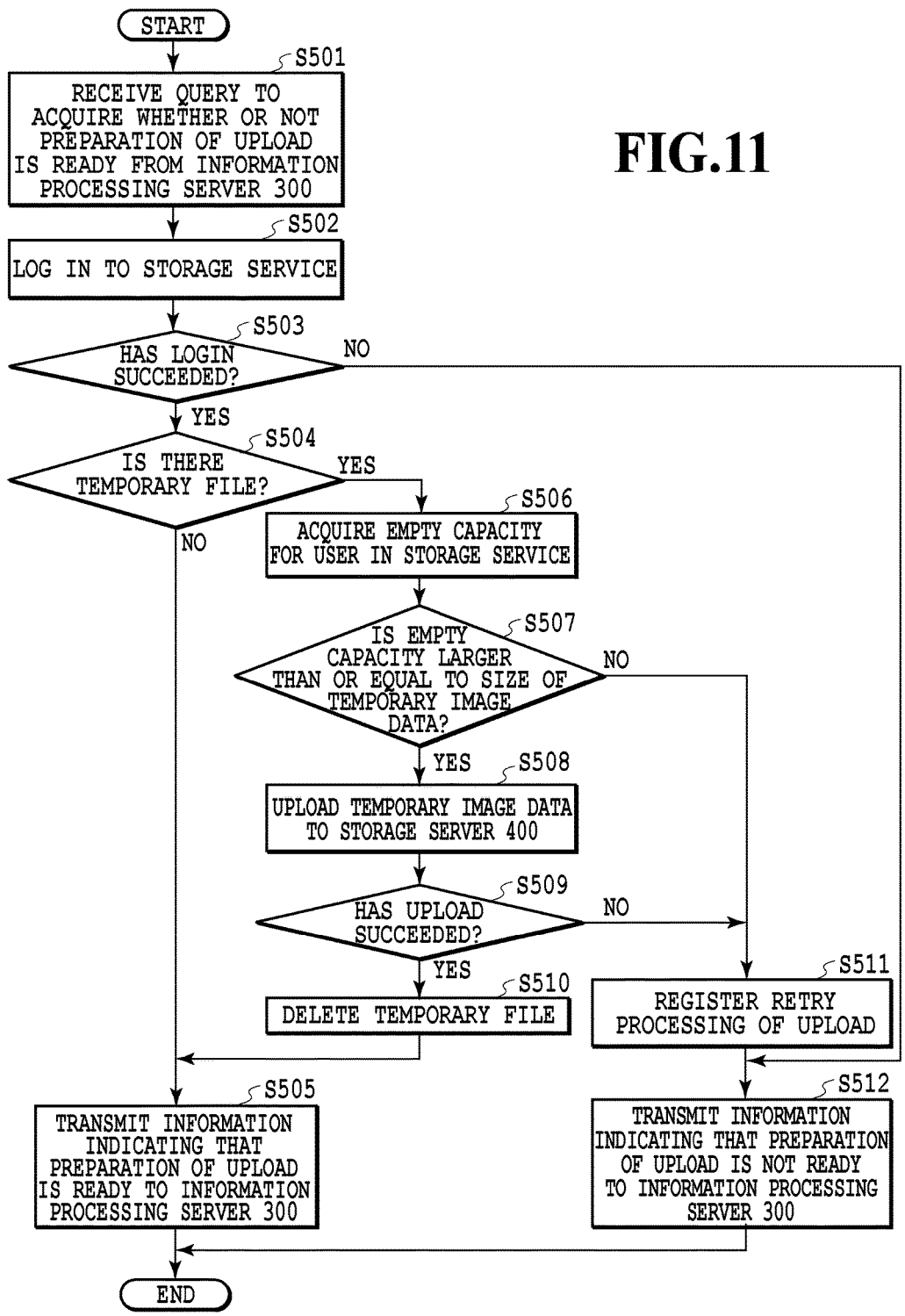
FIG. 11 is a flowchart of processing that is performed by the information processing server according to the first embodiment.

FIG. 11 is a flowchart of preprocessing performed by the information processing server 301, which receives a query to inquire whether or not preparation of upload is ready, in order to transmit a response to the query. The "preprocessing" means processing that is performed in advance to upload image data obtained by document reading and includes upload preparation processing (e.g., securing an empty capacity) and the like.

At S501, the information processing server 301 receives a query to inquire whether or not preparation of upload is ready from the information processing server 300. At S502, the information processing server 301 logs in to a storage service (storage server 400) that a user desires to make use of by using information (user name, password, etc.) held in a scan ticket included in the query received at S501. It may also be possible to perform login processing after receiving the query at S501 or the login state by the login processing performed at a previous point in time maybe continued. In the case where the login state is continued, the login processing at this step is skipped. At S503, the information processing server 301 determines whether or not the login to the storage service has succeeded. In the case where the results of the determination at S503 indicate that the login has succeeded, the processing advances to S504 and on the other hand, in the case where the results of the determination at S503 indicate that the login has failed, the processing advances to S512.

At S504, the information processing server 301 determines whether or not a temporary file (image data and scan ticket) corresponding to a user during login is saved in the information processing server 301. In the case where the results of the determination at S504 indicate that the temporary file is not saved, the processing advances to S505 and on the other hand, in the case where the results of the determination at S504 indicate that the temporary file is saved, the processing advances to S506.

At S505, the information processing server 301 transmits information indicating that preparation of upload is ready to the information processing server 300 as a response to the query received at S501.

In the case where the temporary file corresponding to a user during login exists (YES at S504), the information processing server 301 acquires an empty capacity for the user in the storage service at S506. At S507, the information processing server 301 compares the empty capacity acquired at S506 with the size of the image data temporarily saved as a temporary file and determines whether or not the empty capacity is larger than or equal to the size of the image data. In the case where the results of the determination at S507 indicate that the empty capacity is larger than or equal to the size of the temporary image data, the processing advances to S508 and on the other hand, in the case where the results of the determination at S507 indicate that the empty capacity is less than the size, the processing advances to S511. In the case where there is no method for investigating the empty capacity for a user in the storage service, S506 and S507 maybe omitted.

At S508, the information processing server 301 tries upload of the image data temporarily saved as a temporary file to the storage server 400 (retry processing of upload). At S509, the information processing server 301 determines whether or not the upload at S508 has succeeded. In the case where the results of the determination at S509 indicate that the upload has succeeded, the processing advances to S510 and on the other hand, in the case where the results of the determination at S509 indicate that the upload has failed, the processing advances to S511.

In the case where the upload of the temporary file has succeeded (YES at S509), at S510, the information processing server 301 deletes the image data saved as the temporary file and the scan ticket from the temporary folder. Then, at S505, the information processing server 301 transmits information indicating that preparation of upload is ready to the information processing server 300 as a response to the query received at S501.

In the case where temporary image data exists but the empty capacity to upload the image data is short (NO at 507) or in the case where the upload of the image data has failed (NO at S509), the processing advances to S511. At S511, the information processing server 301 registers retry processing of upload in a job list. Then, at S512, the information processing server 301 transmits information indicating that preparation of upload is not ready to the information processing server 300 as a response to the query received at S501.

In the case where the login to the storage service has failed (NO at S503), at S512, the information processing server 301 transmits information indicating that preparation of upload is not ready to the information processing server 300 as a response to the query received at S501.

In the case where, at S505 or S512, the information processing server 301 transmits a response to the query received at S501, the series of processing ends. The above is the contents of the preprocessing that is performed by the information processing server 301 according to the present embodiment.

(About Processing Performed by Information Processing Server 301 (Processing to Receive and Upload Image Data Obtained by Document Reading))

Figure 12:
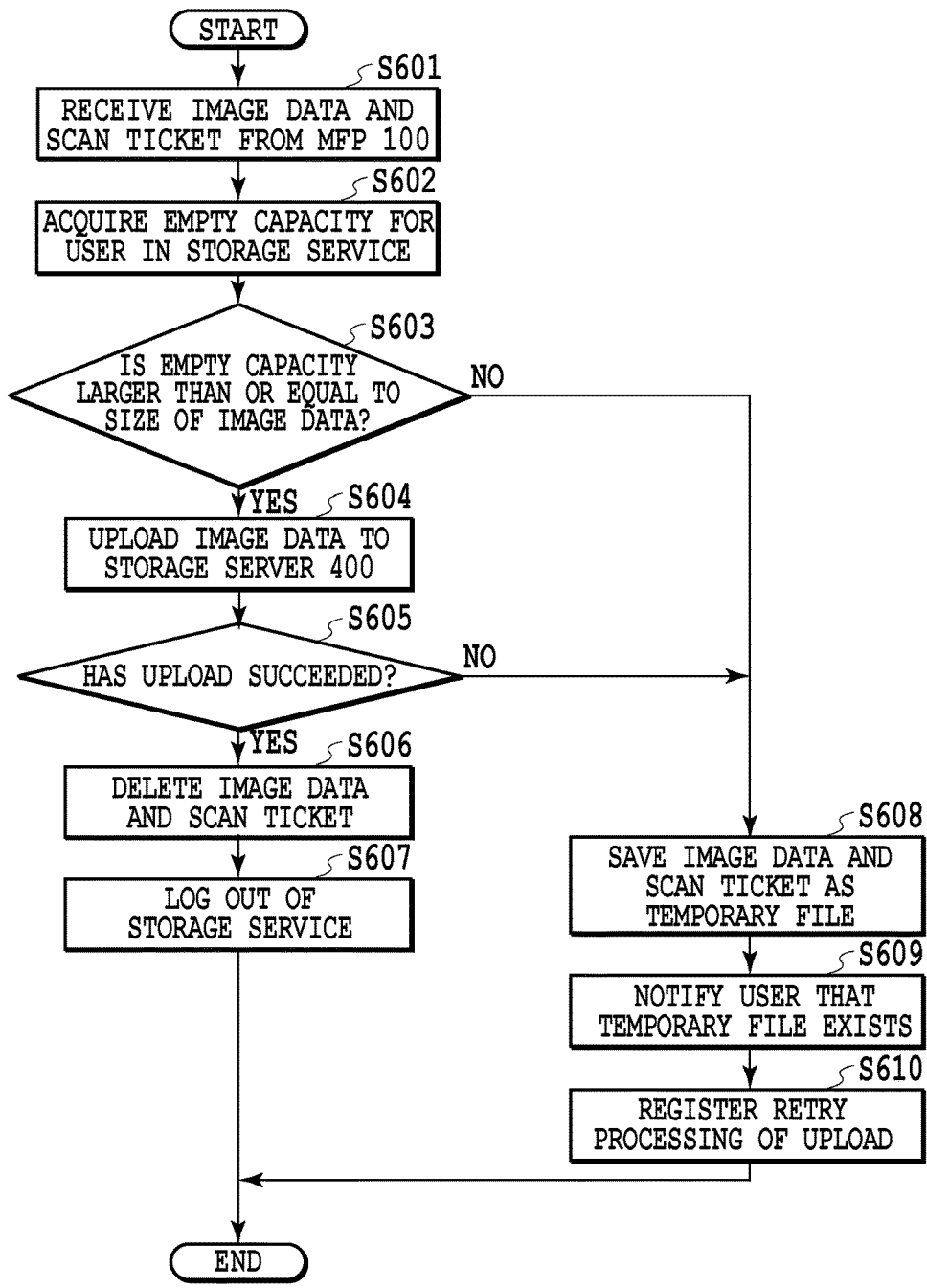
FIG. 12 is a flowchart of processing that is performed by the information processing server according to the first embodiment.

FIG. 12 is a flowchart of processing to receive and upload image data obtained by document reading in the MFP 100, which is performed by the information processing server 301 according to the present embodiment.

At S601, the information processing server 301 receives image data and a scan ticket from the MFP 100. As described above, the image data that is uploaded to the storage server 400 is generated by performing image processing, file format conversion, etc., in accordance with the necessity for the image data that is received at this step (see FIG. 10). At S602, the information processing server 301 acquires the empty capacity for a user already during login in the storage service in the stage of the above-described preprocessing. At S603, the information processing server 301 compares the empty capacity acquired at S602 with the size of the image data that is uploaded to the storage server 400 and determines whether or not the empty capacity is larger than or equal to the size of the image data. In the case where the results of the determination at S603 indicate that the empty capacity is larger than or equal to the size of the image data that is uploaded, the processing advances to S604 and on the other hand, in the case where the results of the determination at S603 indicate that the empty capacity is less the size of the image data that is uploaded, the processing advances to S608.

At S604, the information processing server 301 performs upload of the image data to the storage server 400. At S605, the information processing server 301 determines whether or not the upload at S604 has succeeded and in the case where the results of the determination indicate that the upload has succeeded, the processing advances to S606 and on the other hand, in the case where the results of the determination indicate that the upload has failed, the processing advances to S608.

At S606, the information processing server 301 deletes the image data whose upload to the storage server 400 has succeeded and the scan ticket associated with the image data. Then, the information processing server 301 logs out of the storage service (storage server 400) at S607.

In the case where an error has occurred due to the empty capacity shortage or the failure in upload (NO at S603 or S605), the processing advances to S608. At S608, the information processing server 301 saves image data that cannot be uploaded and the scan ticket associated with the image data as a temporary file. At the time of saving a temporary file at this step, it may also be possible to save the temporary file in association with a user (for each user) in order to make it easy to search for the temporary file, which is performed later. At S609 that follows, the information processing server 301 notifies a user of the existence of the temporary file. Here, as a method of notifying a user of the existence of the temporary file, it is considered to transmit a mail to a registered mail address of a user who has performed the job or to make use of the SNS. For example, in the case where an error has occurred due to the empty capacity shortage, it may also be possible for the information processing server 301 to transmit a mail with contents of "Scanned data cannot be saved because of empty capacity shortage. Secure an empty capacity.", or to tweet the same contents via the SNS. Alternately, it is also considered for the information processing server 301 to launch a corresponding application on the client 201 and to display an error message, or for the information processing server 301 to notify a user of an error at timing at which a corresponding application is launched on the client 201. The notification of an error to a user at this step may be omitted. At S610, the information processing server 301 registers retry processing of upload in the job list so that the retry processing is performed later.

In the case where the information processing server 301 logs out at S607 or registers retry processing of upload at S610, the series of processing ends.

(About Retry Processing of Upload)

In the following, retry processing of upload is explained. As described above, the retry processing of upload is real-time processing that is performed in the case where a temporary file corresponding to a user exists at the time of the user giving instructions to perform document reading (S508 in FIG. 11). As described above, the retry processing of upload is processing that is performed by the action of a user as a trigger, but it is desirable for the information processing server 301 to repeatedly perform the retry processing on the background irrespective of the action of a user. The reason is that by doing so, in the case where a user secures an empty area by deleting an unnecessary file within the storage server, temporary image data is uploaded automatically and it is made possible to acquire new image data by document reading and to upload the image data. However, it takes time for a user to perform processing to delete an unnecessary file, and therefore, performing the retry processing frequently is not so good and performing the retry processing frequently imposes a burden on the information processing server 301. Consequently, it is desirable to perform the retry processing of upload at each predetermined time.

Figure 13:
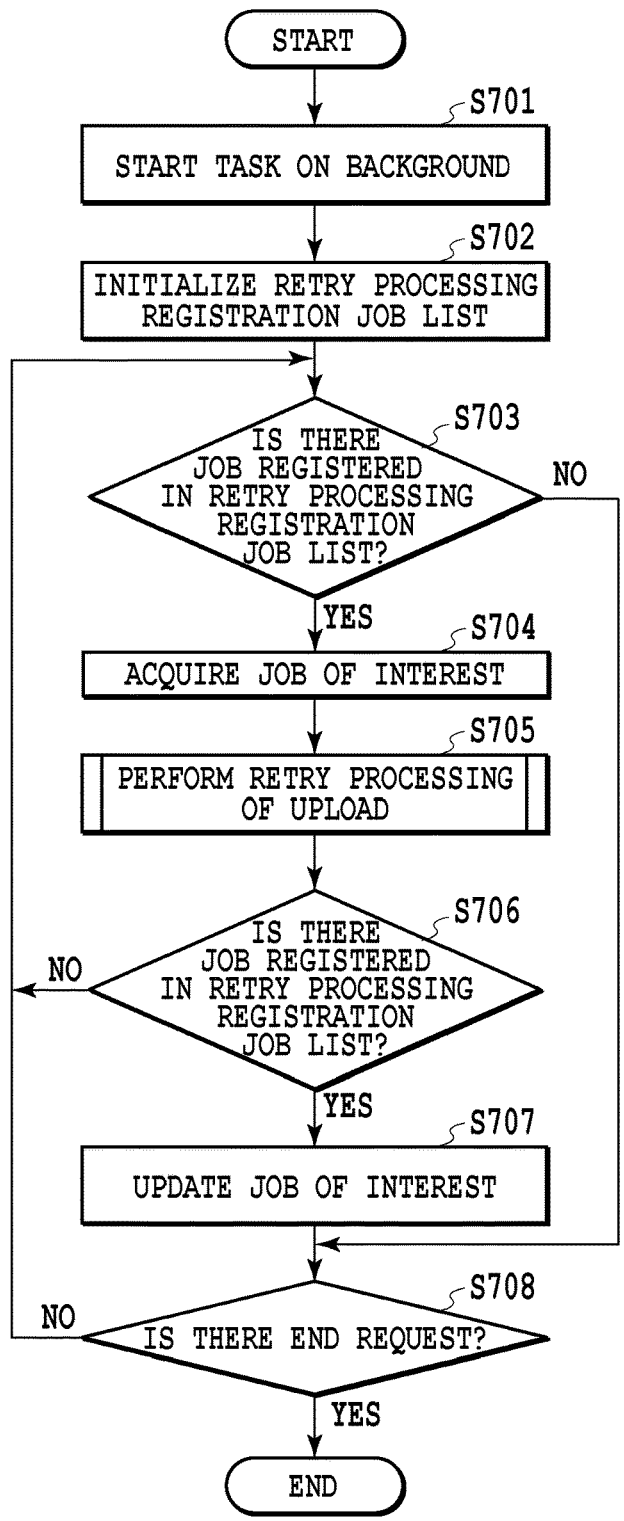
FIG. 13 is a flowchart of processing that is performed by the information processing server according to the first embodiment.

FIG. 13 is a flowchart of processing to control the retry processing of upload. At the same time that the information processing server 301 is activated and reception of a reading job is made possible, a process to perform the retry processing of upload starts.

At S701, the information processing server 301 starts a task to control the retry processing of upload on the background. At S702, the information processing server 301 initializes a job list (hereinafter, retry processing registration job list) in which the retry processing of upload is registered as a job to be performed. By the initialization at this step, a state is entered where no job is registered in the retry processing registration job list and at S511 or S610 described above, the retry processing of upload is added to the retry processing registration job list. At S703, the information processing server 301 determines whether or not there is a job (i.e., retry processing of upload) registered in the retry processing registration job list. In the case where the results of the determination at S703 indicate that there is a job registered in the retry processing registration job list, the processing advances to S704 and in the case where the results of the determination at S703 indicate that there is not a job registered in the retry processing registration job list, the processing advances to S708.

At S704, the information processing server 301 acquires a job of interest in order to process the jobs registered in the retry processing registration job list in order. At S705, the information processing server 301 performs the job of interest (retry processing of upload). Although details will be described later (see FIG. 14), in the case where the upload has succeeded at this step, the temporary image file corresponding to the job of interest is deleted, and therefore, the job of interest is excluded from the targets of subsequent processing and the determination targets. At S706, the information processing server 301 determines whether or not there is a job (i.e., retry processing of upload) registered in the retry processing registration job list. In the case where the results of the determination at S706 indicate that there is a job registered in the retry processing registration job list, the processing advances to S707 and in the case where the results of the determination at S706 indicate that there is not a job registered in the retry processing registration job list, the processing returns to S703.

At S707, the information processing server 301 updates the job of interest. Specifically, the information processing server 301 sets the job registered after the job on which attention has been focused so far as the job of interest. In the case where there is not a job registered after the job on which attention has been focused so far, the job registered first is set as the job of interest. At S708, the information processing server 301 determines whether or not a request to end the process to perform the retry processing of upload has been received from the system. In the case where the results of the determination at S708 indicate that a request to end the process has been received, the series of processing ends and on the other hand, in the case where the results of the determination at S708 indicate that a request to end the process has not been received, the processing returns to S703.

Figure 14:
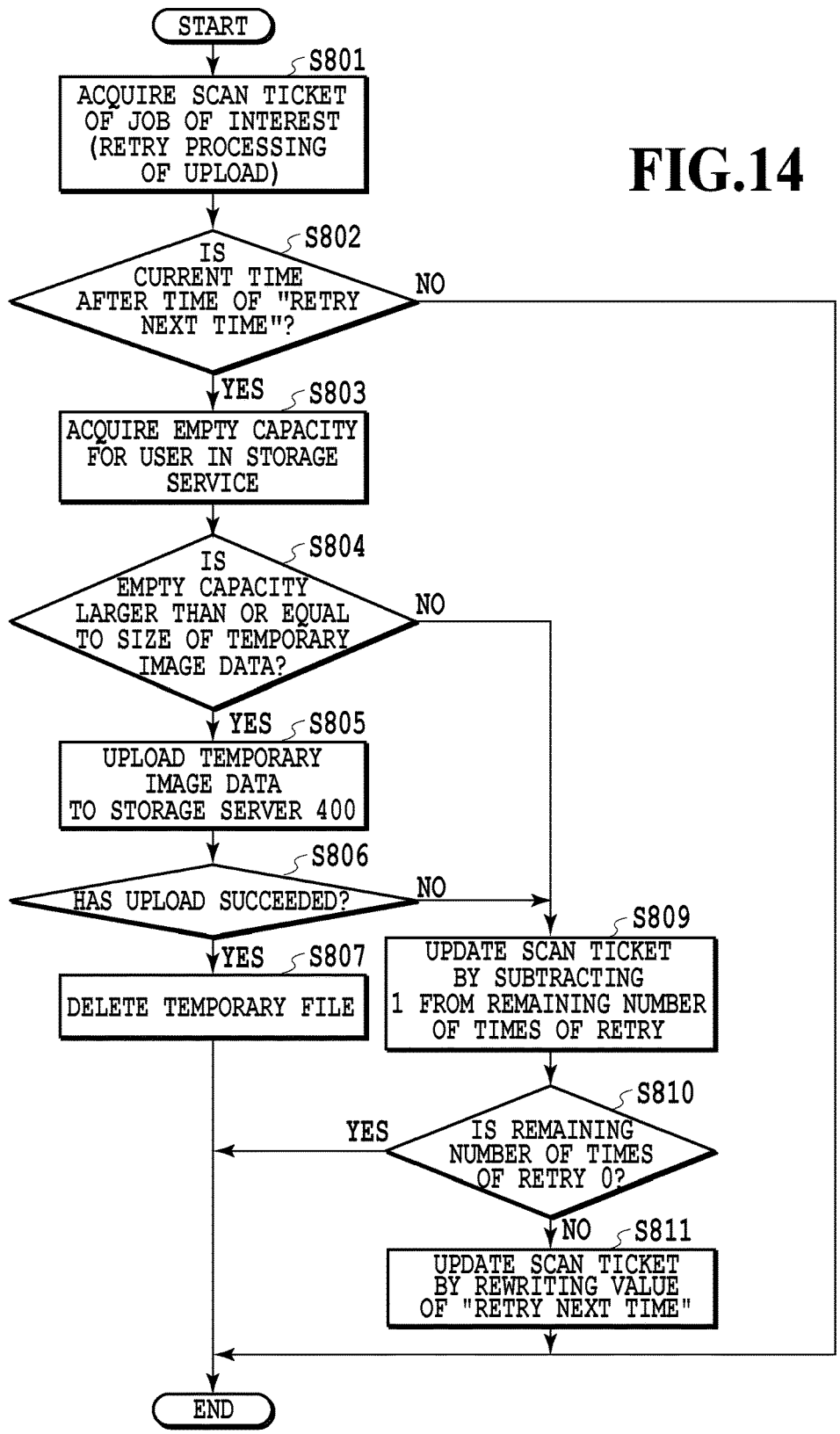
FIG. 14 is a flowchart of processing that is performed by the information processing server according to the first embodiment.

FIG. 14 is a flowchart of the retry processing that is performed at S705 in FIG. 13. At S801, the information processing server 301 acquires a scan ticket corresponding to the job of interest (i.e., retry processing of upload) acquired at S704. As described above, the scan ticket holds information relating to timing to start the retry processing in the item "Retry Next Time" (see FIG. 8), and therefore, the value (time) of "Retry Next Time" is acquired at this step. At S802, the information processing server 301 determines whether or not the current time is after the time of "Retry Next Time". In the case where the results of the determination at S802 indicate that the current time is after the time of "Retry Next Time", the processing advances to S803 and in the case where the results of the determination at S802 indicate that the current time is not after the time of "Retry Next Time", the series of processing ends.

At S803, the information processing server 301 acquires the empty capacity for a user in the storage service. At S804, the information processing server 301 compares the empty capacity acquired at S803 with the size of the temporary image data and determines whether or not the empty capacity is larger than or equal to the size of the temporary image data. In the case where the results of the determination at S804 indicate that the empty capacity is larger than or equal to the size of the temporary image data, the processing advances to S805 and on the other hand, in the case where the results of the determination at S804 indicate that the empty capacity is less than the size of the temporary image data, the processing advances to S809.

At S805, the information processing server 301 tries to upload the temporary image data to the storage server 400. At S806, the information processing server 301 determines whether or not the upload at S805 has succeeded. In the case where the results of the determination at S806 indicate that the upload has succeeded, the processing advances to S807 and on the other hand, in the case where the results of the determination at S806 indicate that the upload has failed, the processing advances to S809.

At S807, the information processing server 301 deletes the image data saved as the temporary file and the scan ticket from the temporary folder and the series of processing ends.

In the case where the empty capacity to upload the temporary image data is short (NO at S804) or in the case where the upload has failed (NO at S806), the processing advances to S809. At S809, the information processing server 301 updates the scan ticket by subtracting 1 from the value of "Remain Retry Counter" (i.e., remaining number of times of retry). At S810, the information processing server 301 determines whether or not the value of "Remain Retry Counter" is 0. In the case where the results of the determination at S810 indicate that the value of "Remain Retry Counter" is 0, the series of processing ends and on the other hand, in the case where the results of the determination at S810 indicate that the value of "Remain Retry Counter" is not 0, the processing advances to S811.

At S811, the information processing server 301 updates the scan ticket by rewriting the value of "Retry Next Time" by an arbitrary time after the current time for the next retry and then the series of processing ends. At the time of rewriting the value of "Retry Next Time" at S811, it may also be possible to set the intervals of the retry processing short at first and then to set the intervals of the retry processing so as to become longer as the number of times of retry processing performed increases.

(About Processing Performed by System)

Figure 15A:
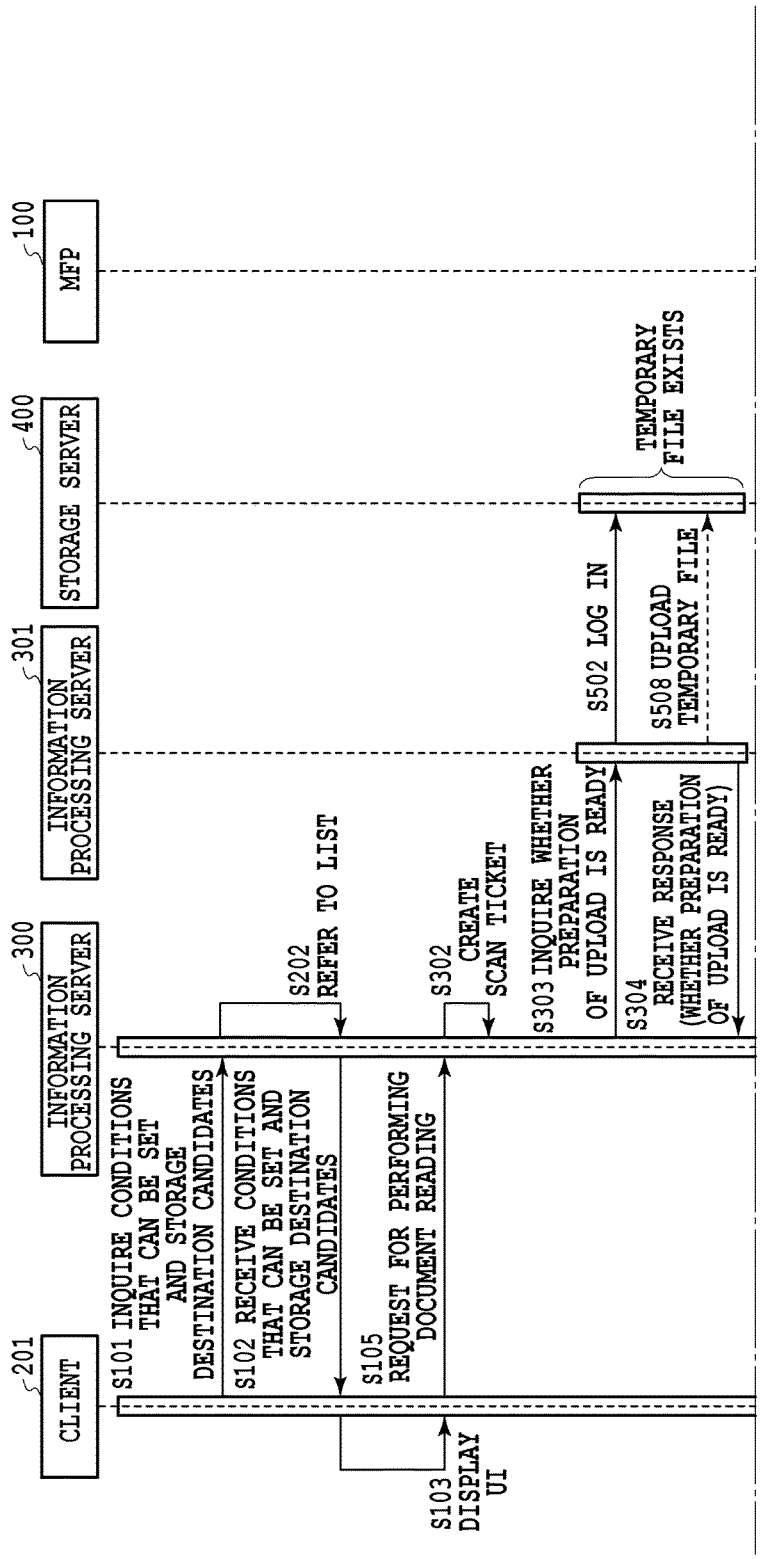
FIG. 15A is a sequence chart of processing that is performed by the system according to the first embodiment.
Figure 15B:
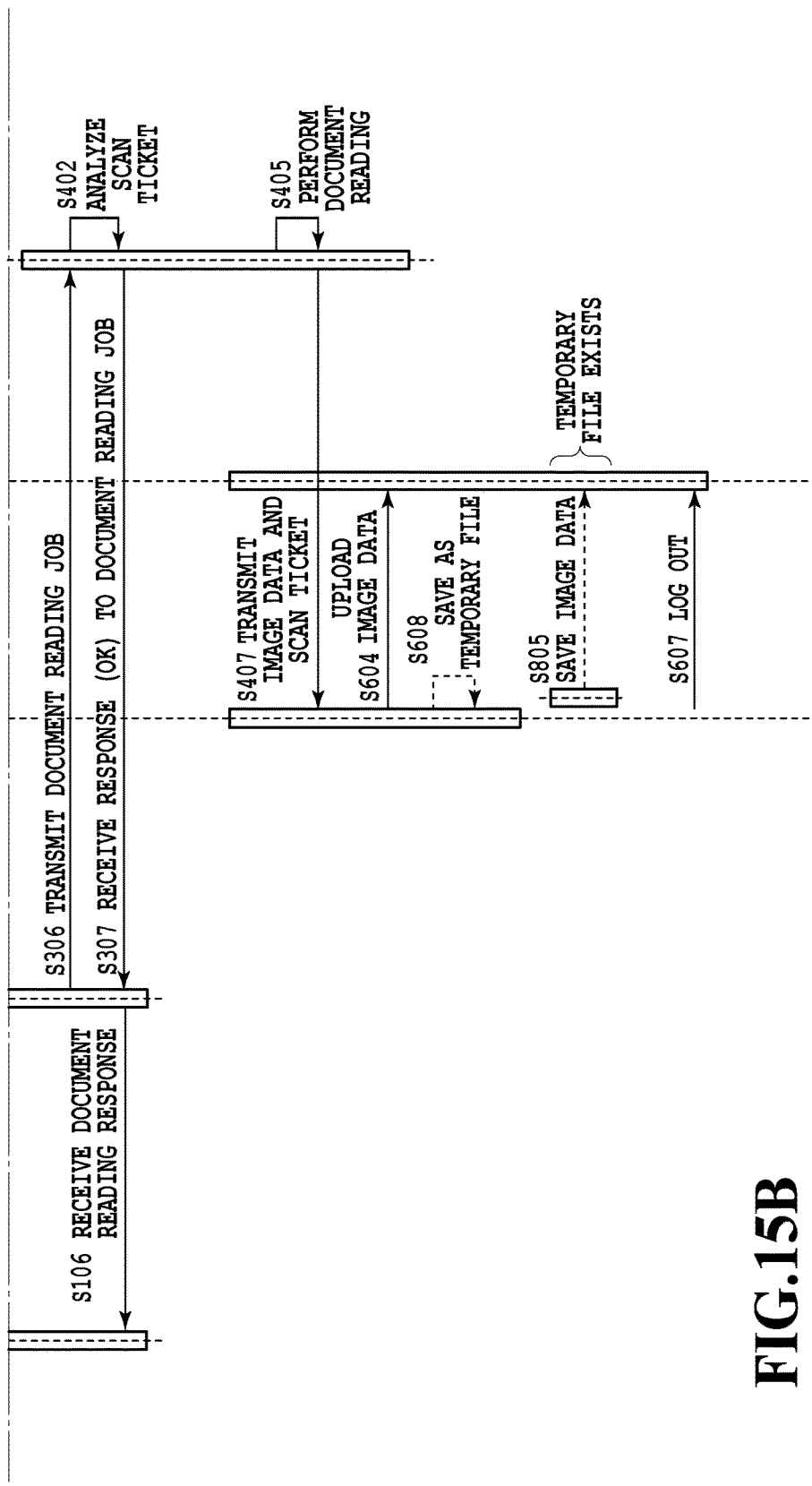
FIG. 15B is a sequence chart of processing that is performed by the system according to the first embodiment.

FIGS. 15A and 15B are sequence charts for explaining processing, which is performed by the system according to the present embodiment, from a user giving instructions to perform document reading by using the client 201 until image data is uploaded to the storage server 400. In the following, each piece of processing is explained in time series.

The client 201 makes an inquiry about conditions relating to document reading that can be set on the user side and storage destination candidates to the information processing server 300 (S101). The information processing server 300 refers to a list stored in the database that is held by the information processing server 300 itself, acquires information including conditions relating to document reading that can be set on the user side and storage destination candidates (S202), and transmits the information to the client 201. The client 201 receives the information (S102), displays a UI based on the received information (S103), and transmits a document reading request that is set by a user via the UI to the information processing server 300 (S105). The information processing server 300 creates a scan ticket in accordance with the received document reading request (S302) and makes an inquiry about whether preparation of upload is ready to the information processing server 301 that manages upload (S303). The information processing server 301 having received the inquiry logs in to the storage server 400 (S502). Further, the information processing server 301 determines whether or not temporary image data exists and in the case where temporary image data exists, the information processing server 301 tries to upload the image data to the storage server 400 (S508). Furthermore, the information processing server 301 transmits information indicating whether or not preparation of upload is ready to the information processing server 300. The information processing server 300 receives the transmitted information (S304).

In the following, a case where temporary image data is not saved in the information processing server 301 and a case where the information processing server 301 has succeeded in uploading temporary image data are explained. In these cases, preparation of upload of new image data is ready in the information processing server 301, and therefore, the information processing server 300 transmits a document reading job to the MFP 100 (S306). The MFP 100 receives the document reading job, analyzes a scan ticket included in the document reading job (S402), and transmits information indicating whether or not the document reading job has been received to the information processing server 301 as a response to the received document reading job. In this example, it is assumed that reception of the document reading job has succeeded. The information processing server 300 receives a response (OK) to the document reading job (S307) and transmits a document reading response based on the received response (OK) to the client 201. After this, the client 201 receives the document reading response (S106).

The MFP 100 performs document reading based on the contents of the scan ticket (S405) and transmits the acquired image data and scan ticket to the information processing server 301 (S407). At the time of the MFP 100 transmitting the scan ticket, it may also be possible to update the scan ticket in accordance with the necessity by, such as writing processing contents in the MFP 100.

The information processing server 301 having received the image data and scan ticket performs image processing and file format conversion processing for the image data in accordance with the necessity and uploads the image data to the storage server 400 (S604). In the case where the upload has succeeded, the information processing server 301 logs out of the storage server 400 (S607). On the other hand, in the case where the upload has failed, the information processing server 301 saves the image data intended to be transferred to the storage server 400 as a temporary file as it is (S608). The retry processing to upload temporary image data is performed automatically (i.e., once at each predetermined time and repeated a predetermined number of times) for the temporary image data saved in the information processing server 301 (S805). In the case where the upload to the storage server 400 has succeeded, the temporary image data is deleted from the information processing server 301.

As described above, in the present embodiment, temporary image data is made use of for upload of data that makes use of the storage service. Due to this, even in the case where it is not possible to transfer image data acquired by document reading in the MFP to the storage server because of the shortage of the empty capacity for a user in the storage service, it will no longer happen that the image data is lost. Consequently, it is possible for a user to use the functions of the MFP to the maximum without any anxiety. Further, in the present embodiment, automatic upload of temporary image data to the storage server is tried. Due to this, the convenience of a user improves. Furthermore, in the present embodiment, even in the case where a variety of MFPs and storage services with different functional performance exist, it is not necessary for the server to manage them individually, and therefore, it is possible to mount the present embodiment in a variety of systems flexibly.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Due to the present invention, it is possible to prevent data from being lost even in the case where upload of the data has failed and to prevent saved data from being deleted without a user knowing it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-082228, filed Apr. 15, 2016, which is hereby incorporated by reference wherein in its entirety.

What is claimed is:

1. A data processing system that saves data in a storage server, the system comprising:
a server system that comprises a memory storing a program and at least one processor to execute the program,
wherein the at least one processor, upon executing the program,
receives first data which is transmitted from an apparatus,
tries upload of the received first data to the storage server,
determines whether or not the upload has succeeded;
saves the first data in the server system itself, in a case where the upload has failed;
logs into the storage server and tries reupload of the saved first data, in a case where the at least one processor receives a request for causing the apparatus to transmit second data when the first data is saved in the server system, and
after the reupload, causes the apparatus to transmit the second data and uploads the second data transmitted by the apparatus to the storage server,
wherein the at least one processor of the server system does not log out from the storage server when the reupload of the first data is completed, and
the at least one processor of the server system logs out from the storage server after the at least one processor uploads the second data.

2. The data processing system according to claim 1, wherein the system includes the apparatus.

3. The data processing system according to claim 1, wherein
the apparatus is an image forming apparatus which can read a document,
in a case where a user gives instructions to perform reading by the image forming apparatus, the at least one processor of the server system causes the image forming apparatus to read a document and receives image data acquired by the reading as the first data or the second data.

4. The data processing system according to claim 3, wherein the server system includes a first server which causes the image forming apparatus to read a document, and a second server which uploads image data acquired by the reading to the storage server.

5. The data processing system according to claim 1, wherein
the at least one processor tries reupload of the first data by performing the reupload once at each predetermined time and repeating the reupload a predetermined number of times.

6. The data processing system according to claim 1, wherein the at least one processor notifies a user that the saved first data exists, in a case where the first data is saved.

7. The data processing system according to claim 6, wherein the at least one processor receives the request from a client device different from the apparatus, and notifies the client device that the saved data exists.

8. The data processing system according to claim 1, wherein
the at least one processor of the server system determines whether or not the reupload of the first data has succeeded, and
the at least one processor causes the apparatus to transmit the second data if it is determined that the reupload of the first data has succeeded.

9. The data processing system according to claim 1, wherein
the at least one processor of the server system deletes the saved first data in the server system itself, in a case where the reupload has succeeded.

10. An information processing server that uploads data by transmitting the data to a storage server, the information processing server comprising:
a memory storing a program; and
at least one processor to execute the program, wherein the at least one processor, upon executing the program,
receives first data which is transmitted from an apparatus;
tries upload of the received first data to the storage server;
determines whether or not the upload has succeeded;
saves the first data in the information processing server itself, in a case where the upload has failed;
logs into the storage server and tries reupload of the saved first data, in a case where the at least one processor receives a request for causing the apparatus to transmit second data when the first data is saved in the information processing server; and
after the reupload, causes the apparatus to transmit the second data and uploads the second data transmitted by the apparatus to the storage server,
wherein the at least one processor of the information processing server does not log out from the storage server when the reupload of the first data is completed, and
the at least one processor of the information processing server logs out from the storage server after the at least one processor uploads the second data.

11. The information processing server according to claim 10, wherein
the apparatus is an image forming apparatus, and
the first data is image data acquired by the image forming apparatus.

12. The information processing server according to claim 10, wherein
the apparatus is an image forming apparatus that can read a document, and
in a case where a user gives instructions to perform reading by the image forming apparatus, the at least one processor of the information processing server causes the image forming apparatus to read a document and receives image data acquired by the reading as the first data or the second data.

13. The information processing server according to claim 10, wherein
the at least one processor tries reupload of the first data by performing the reupload once at each predetermined time and repeating the reupload a predetermined number of times.

14. A method of saving data in a storage server, performed by a server system that includes a memory storing a program and at least one processor that executes the program stored in the memory, the method comprising:
receiving first data which is transmitted from an apparatus;
trying upload of the received first data to the storage server;
determining whether or not the upload has succeeded;
saving the first data in the server system itself, in a case where the upload has failed;
logging into the storage server and trying reupload of the saved first data, in a case where the at least one processor receives a request for causing the apparatus to transmit second data when the first data is saved in the server system; and after the reupload, causing the apparatus to transmit the second data and upload the second data transmitted by the apparatus to the storage server, wherein log out from the storage server is not executed when the reupload of the first data is completed, and the log out from the storage server is executed after the second data is uploaded.

15. The method according to claim 14, wherein the apparatus is an image forming apparatus, and the first data is image data acquired by the image forming apparatus.

16. The method according to claim 14, wherein the apparatus is an image forming apparatus that can read a document, and in a case where a user gives instructions to perform reading by the image forming apparatus, the at least one processor of the server system causes the image forming apparatus to read a document and receives image data acquired by the reading as the first data or the second data.

17. The method according to claim 14, wherein the at least one processor tries reupload of the first data by performing the reupload once at each predetermined time and repeating the reupload a predetermined number of times.

* * * * *